United States Patent
Sakakibara

(10) Patent No.: US 11,371,745 B2
(45) Date of Patent: Jun. 28, 2022

(54) FIN FOR REGISTER

(71) Applicant: HOWA PLASTICS CO., LTD., Toyota (JP)

(72) Inventor: Keisuke Sakakibara, Toyota (JP)

(73) Assignee: HOWA PLASTICS CO., LTD., Toyota (JP)

( * ) Notice: Subject to any disclaimer, the term of this patent is extended or adjusted under 35 U.S.C. 154(b) by 236 days.

(21) Appl. No.: 16/690,629

(22) Filed: Nov. 21, 2019

(65) Prior Publication Data

US 2020/0182509 A1 Jun. 11, 2020

(30) Foreign Application Priority Data

Dec. 5, 2018 (JP) .............................. JP2018-227778

(51) Int. Cl.
*F24F 13/08* (2006.01)
*F24F 13/14* (2006.01)

(52) U.S. Cl.
CPC ........ *F24F 13/1486* (2013.01); *F24F 13/084* (2013.01)

(58) Field of Classification Search
CPC .... F24F 13/1486; F24F 13/084; F24F 13/075; F24F 13/15; B60H 1/3421; B60H 2001/3492
USPC ......................................................... 454/284
See application file for complete search history.

(56) References Cited

U.S. PATENT DOCUMENTS

| 2009/0286462 A1* | 11/2009 | Goto .................... B60H 1/3428 454/155 |
| 2013/0163936 A1* | 6/2013 | Ohta ........................ G02B 6/36 385/80 |
| 2019/0084379 A1* | 3/2019 | Fujisawa .............. B60H 1/3421 |

FOREIGN PATENT DOCUMENTS

| CN | 105904940 A | 8/2016 |
| DE | 102013107173 A1 | 1/2015 |
| EP | 1655160 A2 | 5/2006 |
| EP | 1655160 A3 | 1/2008 |
| EP | 1655160 B1 | 2/2010 |
| JP | 2016-147605 A | 8/2016 |
| JP | 6514906 B2 | 5/2019 |

OTHER PUBLICATIONS

May 6, 2020 Extended European Search Report issued in European Patent Application No. 19210841.3.

* cited by examiner

*Primary Examiner* — Avinash A Savani
*Assistant Examiner* — Ryan L Faulkner
(74) *Attorney, Agent, or Firm* — Oliff PLC

(57) ABSTRACT

Provided is a fin for register that can firmly fix a mounting member to a fin body. A horizontal fin includes a plate-shaped fin body and a mounting member mounted to a downstream side edge part of the fin body. The mounting member has a curved shape to cover the downstream side edge part of the fin body. The downstream side edge part includes a first recessed part at a tip part on a front side in a longitudinal direction. The first recessed part is formed by recessing the tip part of the downstream side edge part. The downstream side edge part and the mounting member are fixed to each other by an adhesive filled in the first recessed part.

5 Claims, 16 Drawing Sheets

FIN FOR REGISTER

CROSS-REFERENCE TO RELATED APPLICATIONS

This application is based upon and claims the benefit of priority of the prior Japanese Patent Application No. 2018-227778, filed on Dec. 5, 2018, the entire contents of which are incorporated herein by reference.

FIELD

This application relates to a fin for register provided in a register for air conditioning provided in a vehicle etc. and changing the direction of wind blown out from the register, specifically relates to a technique of mounting a mounting member to a downstream side edge part of a fin in an air blowing direction.

BACKGROUND

Conventionally, in some of fins for register used for a register for air conditioning, a mounting member for decoration etc. is mounted to a fin body (For example, the Patent Literature 1 etc.). The fin for register disclosed in the Patent Literature 1 includes a fin body and a mounting member mounted to the fin body. The fin body has a plate shape long in one direction. The mounting member is mounted to a downstream side edge part of a fin body in an air blowing direction, and extends along the downstream side edge part. The mounting member is formed into a curved shape so as to cover the downstream side edge part of the fin body.
[Patent Literature 1] Germany Laid-open Patent Publication No. 102013107173

SUMMARY

In the above fin for register, a protrusion part and an insertion hole are joined together by ultrasonic welding in a state where the protrusion part formed in the mounting member is inserted into the insertion hole formed in the fin body. In a fin for register having such a structure, a technique to firmly fix the amounting member to the fin body is required.

The present disclosure has been made to solve the above-mentioned problems.

According to one aspect of the present disclosure, it is provided a fin for register pivotably provided between a pair of side walls facing with each other in a retainer of a register and changing a direction of wind blown out from the register: comprising a fin body formed into a plate shape; and a mounting member mounted to a downstream side edge part of the fin body in an air blowing direction, i.e. a wind flowing direction, wherein the mounting member is formed into a curved shape so as to cover the downstream side edge part of the fin body, the downstream side edge part includes a first recessed part at a tip part on the downstream side in the air blowing direction, wherein the first recessed part is formed by recessing the tip part of the downstream side edge part, wherein the downstream side edge part and the mounting part are fixed to each other by an adhesive filled in the first recessed part.

The object and advantages of the invention will be realized and attained by means of the elements and combinations particularly pointed out in the claims. It is to be understood that both the forgoing general description and the following detailed description are exemplary and explanatory and are not restrictive of the invention.

DESCRIPTION OF EMBODIMENTS

For example in a fin for register as described above, a fin for register pivotably provided between a pair of side walls facing with each other in a retainer of a register and changing a direction of wind blown out from the register: comprising a fin body formed into a plate shape; and a mounting member mounted to a downstream side edge part of the fin body in an air blowing direction, i.e. a wind flowing direction, wherein the mounting member is formed into a curved shape so as to cover the downstream side edge part of the fin body, the downstream side edge part includes a first recessed part at a tip part on the downstream side in the air blowing direction, wherein the first recessed part is formed by recessing the tip part of the downstream side edge part, wherein the downstream side edge part and the mounting part are fixed to each other by an adhesive filled in the first recessed part.

According to the fin for register disclosed herein, the first recessed part into which the adhesive is filled is provided at the downstream side edge part of the fin body. The mounting member is fixed to the fin body by the adhesive filled into the first recessed part.

The adhesive filled into the first recessed part is applied to an inner circumferential surface of the mounting member. The adhesive overflown from the first recessed part spreads out between an outer circumferential surface of the downstream side edge part and an inner circenferential surface of the mounting member by mounting the mounting member to the fin body. Thus, the mounting member can be firmly fixed to the fin body.

Figure 1:
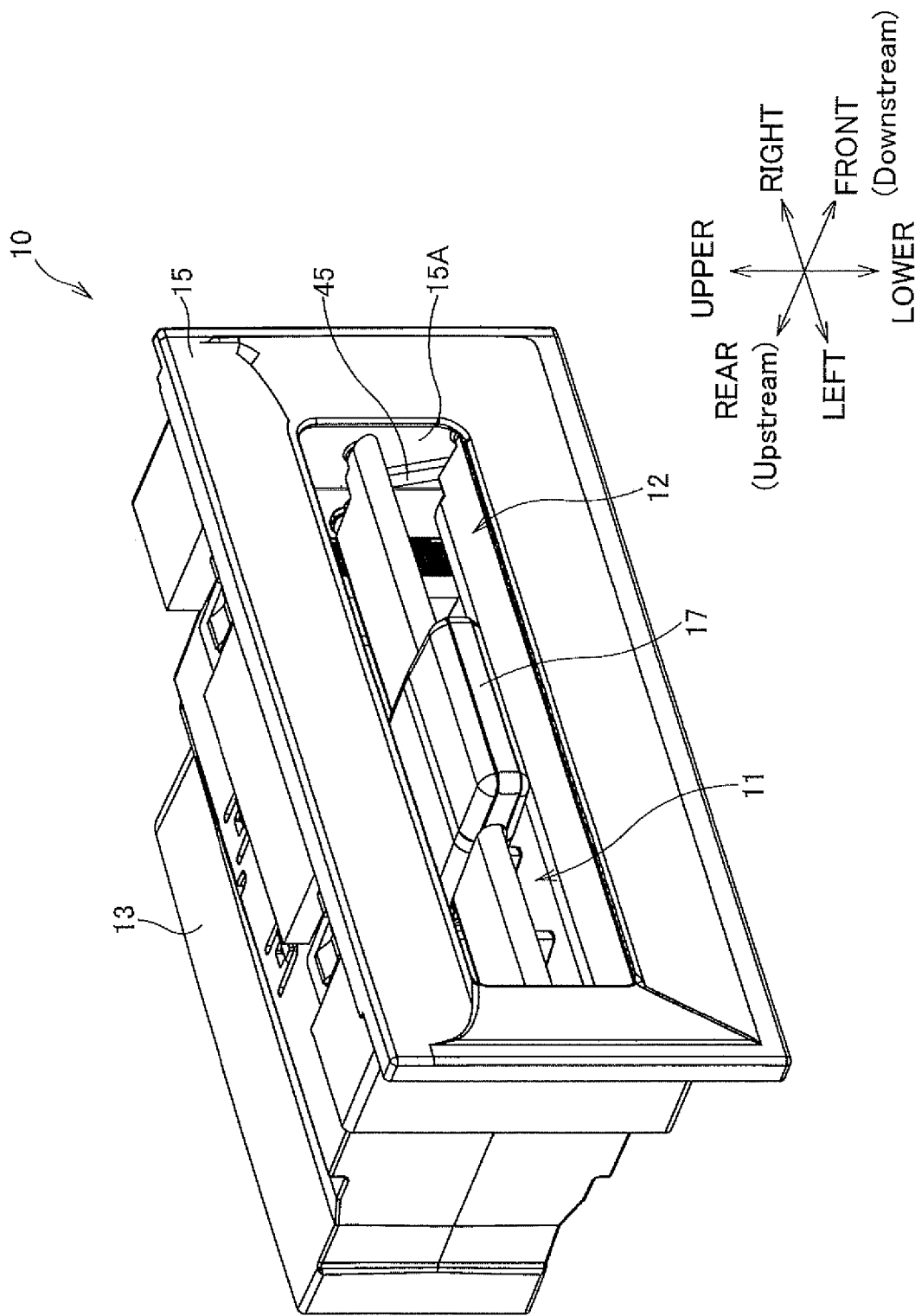
FIG. 1 is a perspective view of a register according to the present embodiment.
Figure 2:
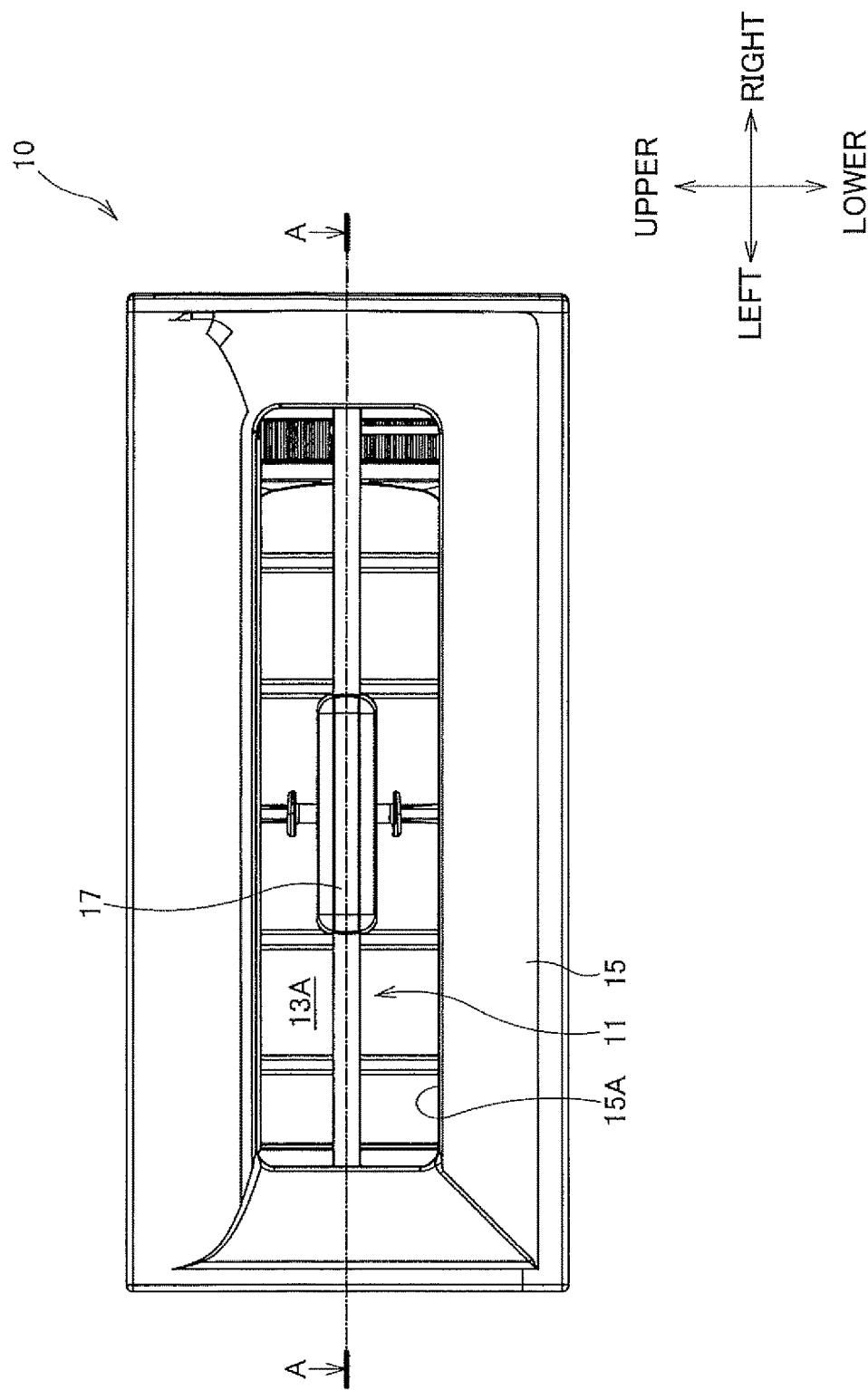
FIG. 2 is a front view of the register.

Hereinafter, a fin for register according to one embodiment of this application will be described in detail with reference to drawings. FIG. 1 is a perspective view of a register 10 provided with a horizontal fin 11 that embodied the fin for register according to the present embodiment. The register 10 is arranged in an instrument panel disposed on the front side of a compartment of an automobile and blows out air supplied from an air conditioner inside a vehicle. The register 10 is formed of a synthetic resin (polybutylene terephthalate (PBT) and ABS resin etc.). FIG. 2 is a front view of the register 10. In the below description, as illustrated in FIGS. 1 and 2, a vertical direction, a lateral direction, and a longitudinal direction are defined with the direction of a user where the register 10 is seen from the front as a reference. In addition, regarding the longitudinal direction, a rear side and a front side are referred to as an upstream side and a downstream side, respectively based on a direction of air flowing inside the register 10.

Figure 3:
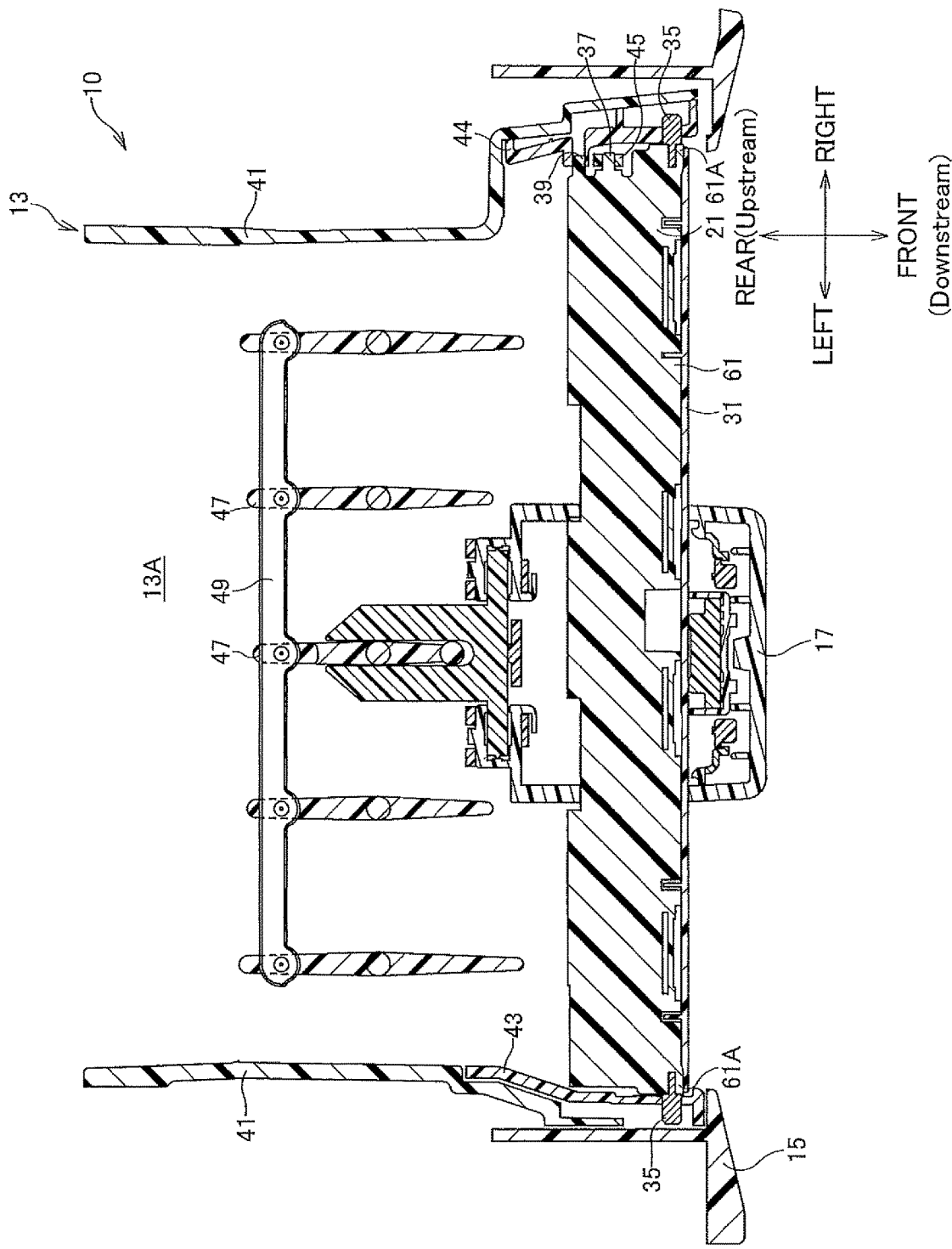
FIG. 3 is a sectional view illustrating a section taken along a line A-A of FIG. 2.

As illustrated in FIGS. 1 and 2, the register 10 has a substantially rectangular shape long in the lateral direction in a front view and includes a retainer 13 and a bezel 15. The retainer 13 formed into a cylindrical shape is provided with a ventilation flue 13A having a substantial rectangular section therein. The bezel 15 is mounted to a front surface of the retainer 13 and is formed with an air blow outlet 15A having a substantial rectangular shape long in the lateral direction. FIG. 3 illustrates a section taken along a line A-A of FIG. 2. As illustrated in FIG. 3, various parts comprising the register 10 are stored inside the retainer 13.

The register 10 according to the present embodiment includes two horizontal fins 11, 12. The horizontal fins 11, 12 are provided at a front end part where the bezel 15 is mounted in the retainer 13 and are disposed inside the air blow outlet 15A. The horizontal fin 11 is one example of the fin for register of the present application. In the below description, as illustrated in FIGS. 1-3, the following explanation is explained with a direction in a state where a position of a front edge and a position of a rear edge of the horizontal fin 11 are aligned vertically (hereinafter, the above state maybe referred to as a neutral state) as a reference.

As illustrated in FIGS. 4-9, the horizontal fin 11 is formed into a substantial rectangular plate shape long in the lateral direction. The horizontal fin 11 includes a fin body 21 and a mounting member 31. The fin body 21 has a prescribed thickness in the vertical direction and extends in the lateral direction while making a width in the longitudinal direction substantially constant. The mounting member 31 is mounted to a front edge of the fin body 21, i.e. a downstream side edge part 61 in a blowing direction of air flowing in the register 10.

A pair of bearing parts 61A is provided in the downstream side edge part 61 at a front end of the fin body 21. Each of the pair of bearing parts 61A is provided in each end part in the lateral direction of the downstream side edge part 61. A shaft insertion hole 35A to be inserted by a rotation shaft 35 (see FIG. 3) is formed in each of the pair of bearing parts 61A. FIGS. 4-9 illustrate a state where the pair of rotation shafts 35 is removed from the shaft insertion hole 35A. Each of the pair of rotation shafts 35 is, for example, a cylindrical rod made of a metal. Each of the pair of rotation shafts 35 is inserted into the shaft insertion hole 35A to be fixed to the fin body 21. When the rotation shaft 35 is disposed on the further downstream side, a force applied to the rotation shaft 35 is increased accompanying rotation of the horizontal fin 11. Thus, the rigidity of the shaft can be enhanced by forming the rotation shaft 35 of a metal, enabling the rotation shaft 35 to be disposed on the further downstream side. As a result, a swing width in the vertical direction of the horizontal fin 11 can be enlarged. A front end part of the horizontal fin 11, i.e., the downstream side edge part 61 is not swung (moved) in the vertical direction by disposing the rotation shaft 35 on the further down stream side. The rotation of the front end part of the horizontal fin 11 when the horizontal fin 11 is swung in the vertical direction can be suppressed by disposing the rotation shaft 35 at the downstream side edge part 61. Accordingly, the swing width of the horizontal fin 11 (front end) seen from the outside of the air blow outlet 15A is made smaller, improving the appearance. Thus, the rotation shaft 35 may not be a separate member from the fin body 21. For example, the rotation shaft 35 may be a shaft made of a resin and integrally formed with the fin body 21.

As illustrated in FIG. 3, the retainer 13 includes a pair of side walls 41 facing with each other in the lateral direction. In the horizontal fin 11, the rotation shaft 35 on the left side can be rotatably held by a bearing member 43 held by the side wall 41 on the left side. Also, in the horizontal fin 11, the rotation shaft 35 on the right side can be rotatably held by a bearing member 44 held by the side wall 41 on the right side. Thus, the horizontal fin 11 is rotatably held in the vertical direction by the retainer 13.

An operation knob 17 is mounted at a substantial center part of the horizontal fin 11 in the lateral direction. The horizontal fin 11 is turned in the vertical direction by operating the operation knob 17. A connection shaft 37 is formed on an end surface 33 on the right side of the horizontal fin 11. The connection shaft 37 is provided on the rear side of the rotation shaft 35. The connection shaft 37 is coupled to a connection shaft (not shown) of the another horizontal fin 12 (see FIG. 1) by a coupling member 45. Thus, the horizontal fins 11, 12 interlockingly turn in the vertical direction to change the blowing direction of the air blown out from the air blow outlet 15A into the vertical direction. A regulation shaft 39 is formed on the end surface 33 on the right side of the horizontal fin 11. The regulation shaft 39 is provided on the rear side of the connection shaft 37. A turning range in the vertical direction of the horizontal fin 11 is regulated within a fixed range by inserting the regulation shaft 39 into the bearing member 44. The horizontal fin 11 may not include the regulation shaft 39.

The operation knob 17 is provided slidably in the lateral direction with respect to the horizontal fin 11. The operation knob 17 is coupled to one of a plurality of vertical fins 47 provided on the rear side of the horizontal fin 11. The register 10 according to the present embodiment includes the five vertical fins 47. The operation knob 17 is coupled to the central vertical fin 47 in the lateral direction out of the five vertical fins 47. The plurality of vertical fins 47 are held turnably in the lateral direction by the retainer 13. The plurality of vertical fins 47 are coupled to each other by a coupling member 49 to interlockingly turn in the lateral direction. Thus, the operation knob 17 is slid in the lateral direction and the plurality of vertical fins 47 are turned in the lateral direction to change the blowing direction of the air blown out from the air blow outlet 15A into the lateral direction.

Figure 9:
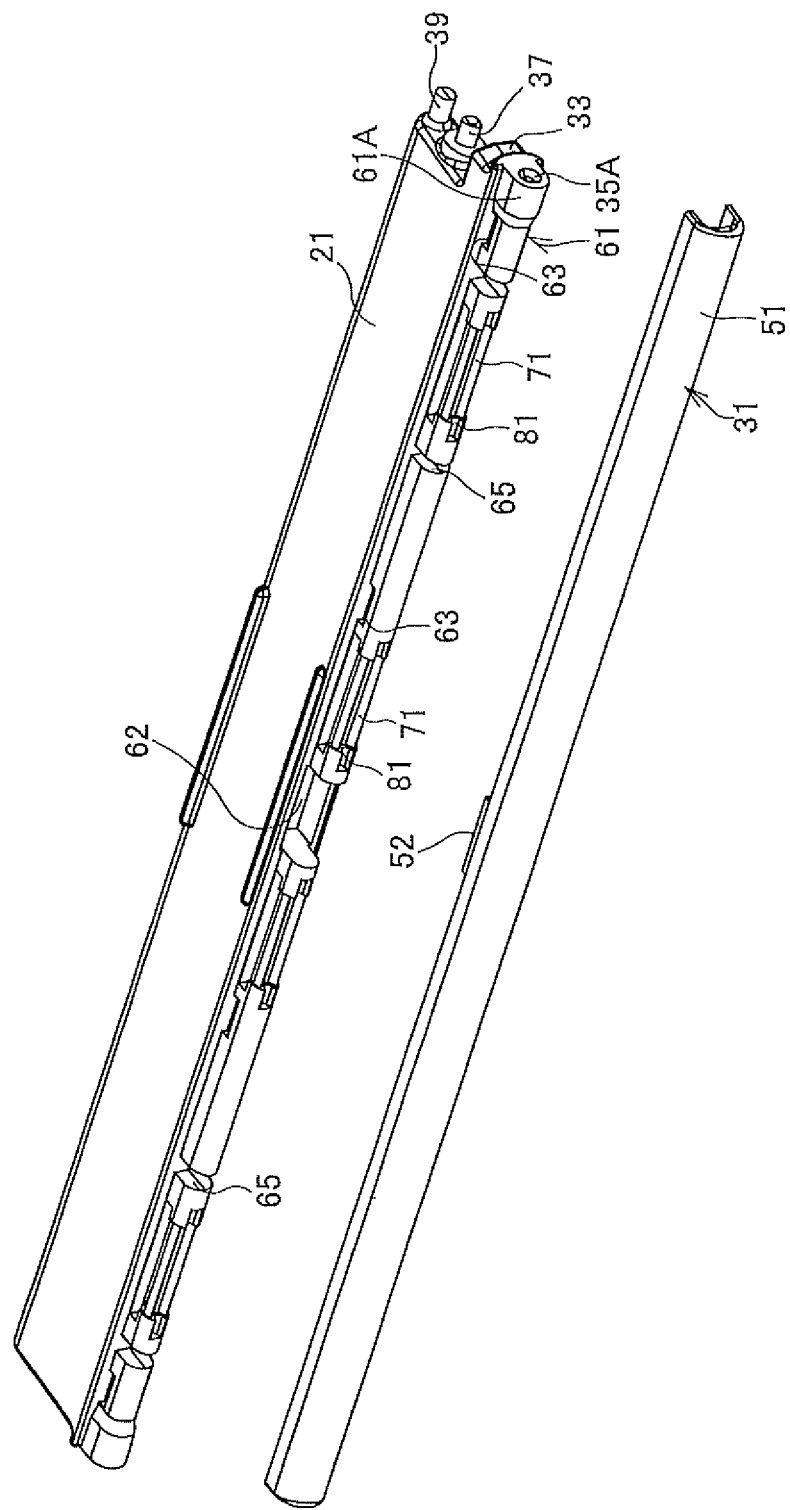
FIG. 9 is exploded perspective view of the horizontal fin.
Figure 10:
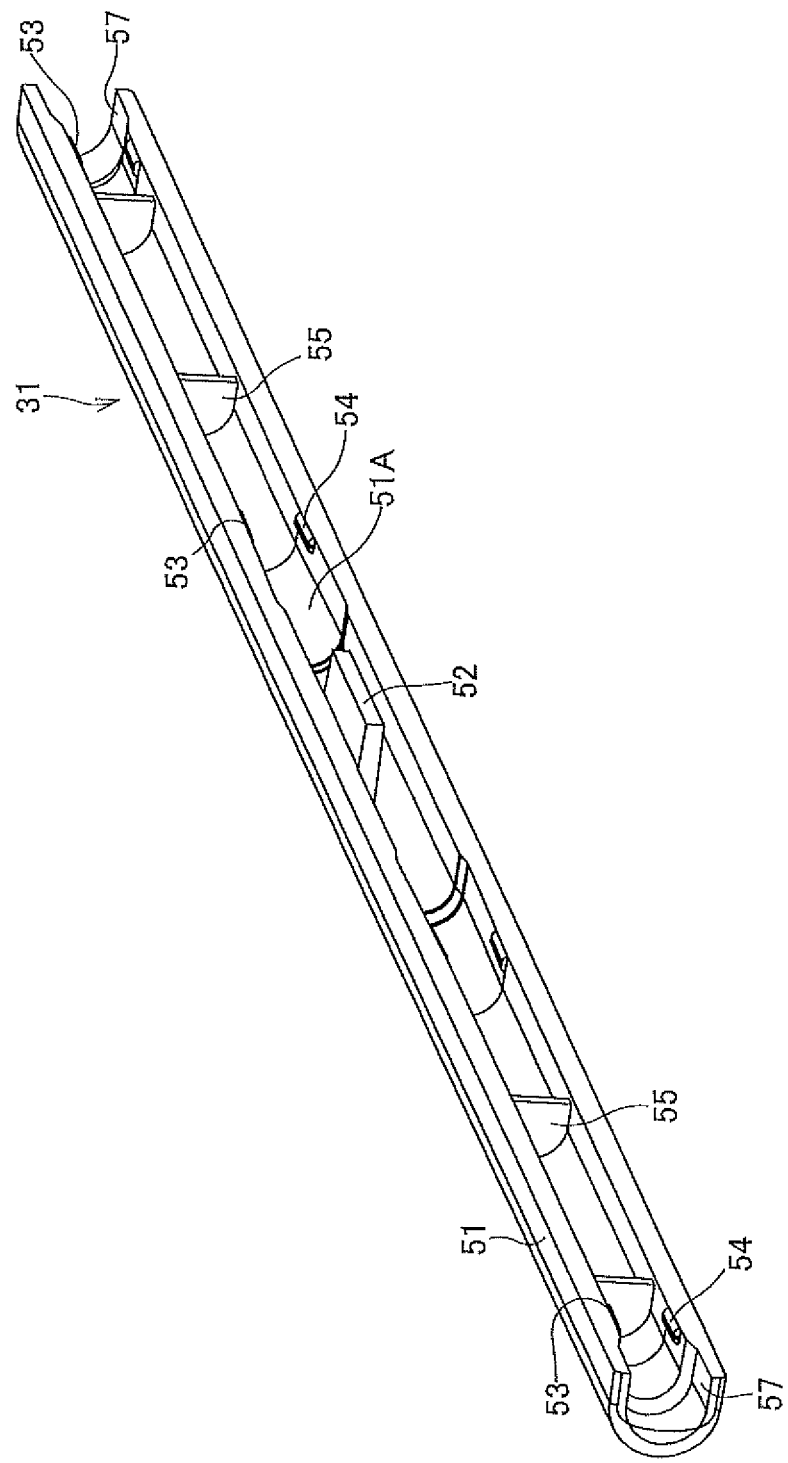
FIG. 10 is a perspective view of a mounting member seen from the rear upper right.

As illustrated in FIGS. 9 and 10, the mounting member 31 includes a curved part 51 curved into an arc shape and a protrusion part 52. The mounting member 31 is fixed to the fin body 21 in a state where the protrusion part 52 is inserted into the fin body 21. The mounting member 31 is entirely plated with silver etc. to improve the decorativeness of the horizontal fin 11 seen from the air blow outlet 15A of the register 10. The mounting member 31 may not be plated, or may be provided with decorations instead of plating.

Figure 7:
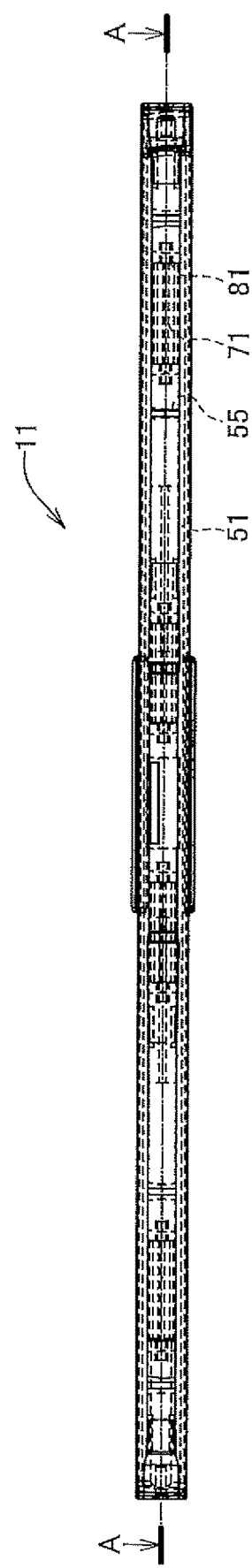
FIG. 7 is a front view of the horizontal fin.
Figure 8:
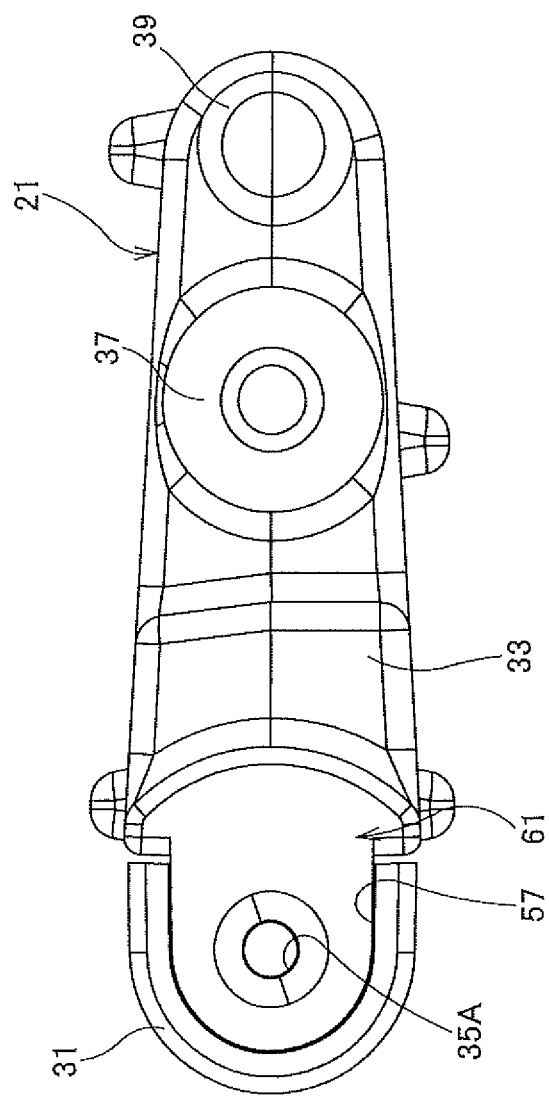
FIG. 8 is a right side view of the horizontal fin.

As illustrated in FIG. 7, a width in the vertical direction of the curved part 51 is substantially the same as a width in the vertical direction of the fin body 21. FIG. 7 is a front view of the horizontal fin 11, and transparently illustrates a shape of the fin body 21. A length in the lateral direction of the curved part 51 is substantially the same as a length in the lateral direction of the downstream side edge part 61 of the fin body 21 (see FIG. 9). As illustrated in FIGS. 9 and 10, the curved part 51 has a shape protruded in an arc shape toward the front side and covers the downstream side edge part 61 of the fin body 21. The protrusion part 52 is formed on an inner circumferential surface 51A at a tip part on the curved upper side of the curved part 51. The protrusion part 52 has a plate shape protruded toward the rear side along the longitudinal direction. The protrusion part 52 is thin in the vertical direction and protrudes toward the rear side with a width in the lateral direction substantially constant.

Figure 11:
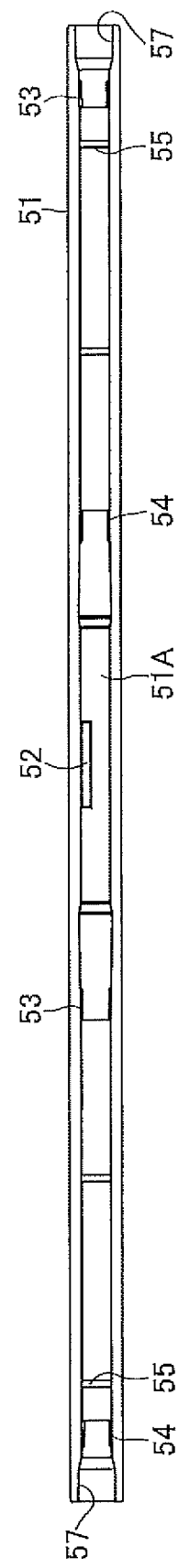
FIG. 11 is a rear view of the mounting member.

As illustrated in FIGS. 10 and 11, the protrusion part 52 is provided at the substantial central part in the lateral direction of the mounting member 31. The protrusion part 52 is formed with a gate hole into which a synthetic resin is poured when the mounting member 31 is molded by injection molding. A length of a resin flow channel from the gate hole can be further equalized by pouring the synthetic resin used for forming the mounting member 31 toward both sides in the lateral direction from the gate hole of the protrusion part 52 formed at the central part in the lateral direction (longitudinal direction of the mounting member 31). Thus, the synthetic resin can be uniformly spread out with a good flowability while keeping a resin flow pressure low. As a result, formability of the mounting member 31 can be improved, and occurrence of unevenness in molding can be prevented. It is difficult to visually confirm the gate hole formed in the protrusion part 52 from the outside due to plating. Also, since the protrusion part 52 is stored into an insertion hole 62 of the fin body 21 (see FIG. 9) in a state where the horizontal fin 11 is assembled, the protrusion part 52 cannot be seen from the outside. Thus, the design of the horizontal fin 11 can be improved.

Figure 6:
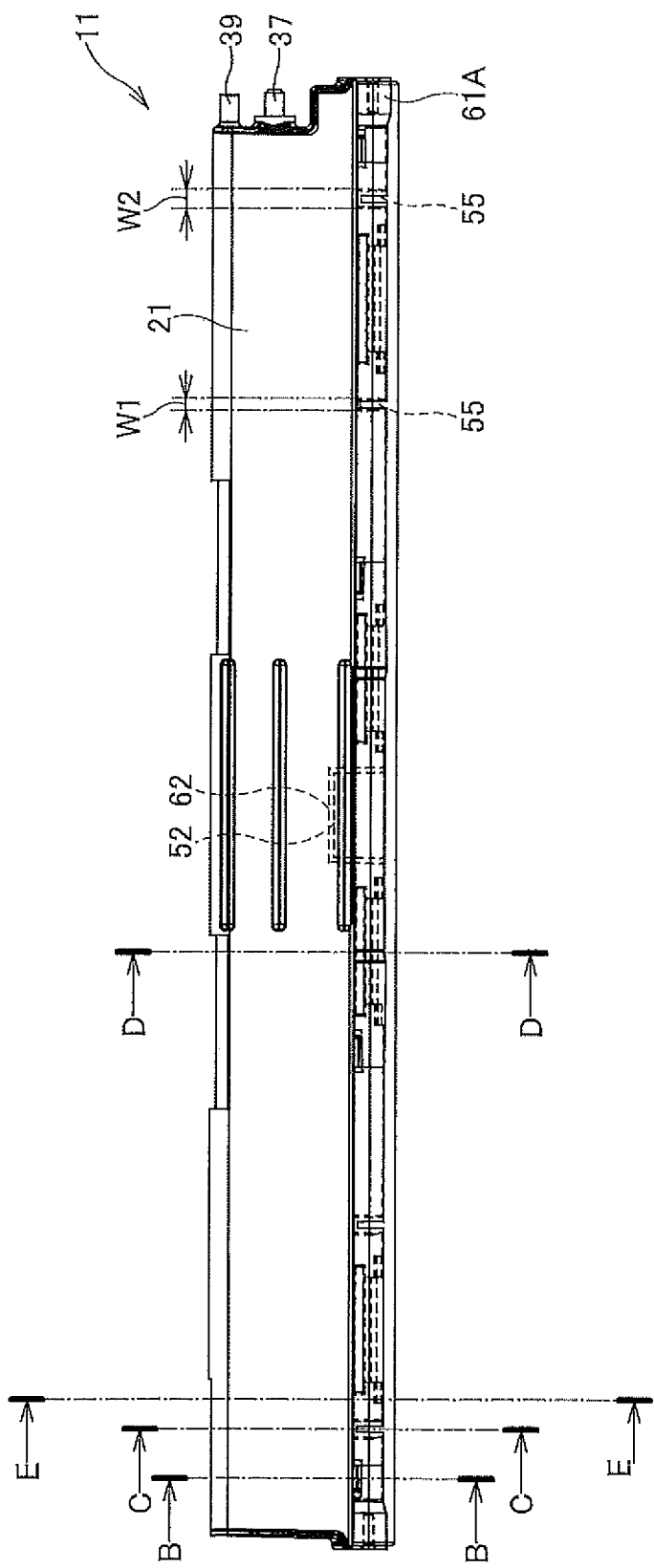
FIG. 6 is a top view of the horizontal fin.

As illustrated in FIG. 9, the insertion hole 62 is formed at the downstream side edge part 61 of the fin body 21 so as to correspond to a position of the protrusion part 52. FIG. 6 transparently illustrates the insertion hole 62 and the protrusion part 52. As illustrated in FIG. 6, the insertion hole 62 is formed by recessing the fin body 21 to the rear side with a width in the lateral direction corresponding to a size of the protrusion part 52. The protrusion part 52 inserted into the insertion hole 62 is disposed with a small space between the protrusion part 52 and the insertion hole 62 in the lateral direction.

As illustrated in FIGS. 10 and 11, the curved part 51 is formed with four claw parts 53 on the inner circumferential surface 51A at the curved upper end. The four claw parts 53 are by two each formed with the protrusion part 52 interposed therebetween in the lateral direction and protrude downward. The four claw parts 53 are arranged at substantially equal intervals in the lateral direction. The curved part 51 is formed with four claw parts 54 on the inner circumferential surface 51A at the curved lower end. Each of the four claw parts 54 has the same shape as the claw part 53 and protrudes upward. The four claw parts 54 are arranged at positions facing each of the four claw parts 53 in the vertical direction. The claw part 54 may be arranged at positions deviated from the claw part 53. The claw part 54 may be different shape from the claw part 53.

Figure 12:
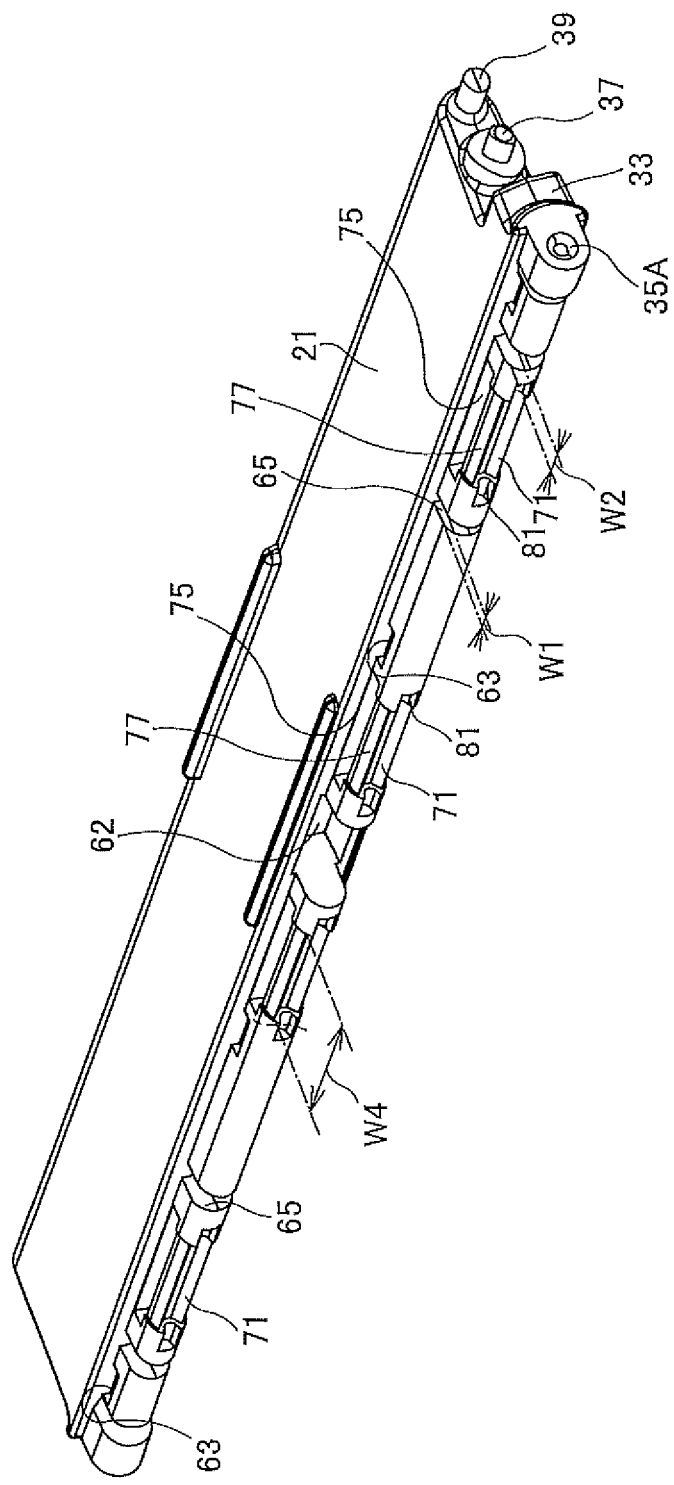
FIG. 12 is a perspective view of a fin body seen from the front upper right.
Figure 13:
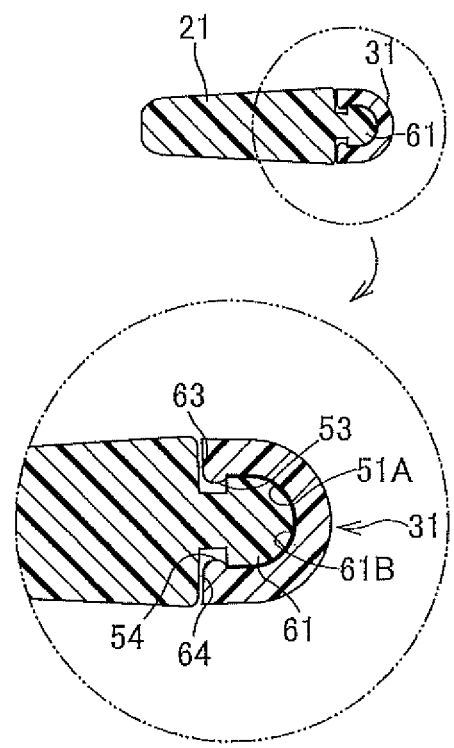
FIG. 13 is a sectional view illustrating a section taken along a line B-B of FIG. 6 and a partly enlarged view thereof.

As illustrated in FIG. 12, engaged parts 63 are formed at an upper part of the downstream side edge part 61 of the fin body 21 so as to correspond to positions of the claw parts 53. Likewise, engaged parts 64 (see FIG. 13) are formed at a lower part of the downstream side edge part 61 so as to correspond to positions of the claw parts 54. FIG. 13 is a sectional view illustrating a section taken along a line B-B of FIG. 6, and illustrates a section where the horizontal fin 11 is taken at the position of the claw part 53. As illustrated in FIG. 13, the downstream side edge part 61 has a front surface formed into an arc shape and is provided with the mounting member 31 in a state of being stored inside the curved part 51. An outer circumferential surface 61B of the downstream side edge part 61 and the inner circumferential surface 51A of the curved part 51 are brought into close contact with each other. The engaged part 63 is formed by recessing the downstream side edge part 61 to the lower side. The claw part 53 is inserted into the engaged part 63 from above. Likewise, the claw part 54 is inserted into the engaged part 64 from below. Detachment and position displacement of the mounting member 31 are prevented by engaging each of the plurality of claw parts 53, 54 of the mounting member 31 with each of the engaged parts 63, 64 of the fin body 21. The mounting member 31 may not include the claw parts 53, 54, and the fin body 21 may not include the engaged parts 63, 64.

As illustrated in FIGS. 10 and 11, the inner circumferential surface 51A of the curved part 51 is formed with four reinforcement ribs 55. Each of the reinforcement ribs 55 has a thin plate shape connecting the inner circumferential surface 51A over a semicircle so as to fill an inside of the curved part 51. A shape of the reinforcement rib 55 seen from one side in the lateral direction has a substantial semicircle shape protruding toward the front side. The reinforcement ribs 55 are formed at positions different from the claw parts 53, 54 in the lateral direction. As illustrated in FIG. 12, the downstream side edge part 61 is formed with rib insertion parts 65 so as to correspond to positions of the reinforcement ribs 55. The reinforcement ribs 55 is inserted into each of the rib insertion parts 65. The rib insertion part 65 is formed by partly cutting out a part of the downstream side edge part 61 in the vertical direction with a width in the lateral direction fixed.

Figure 14:
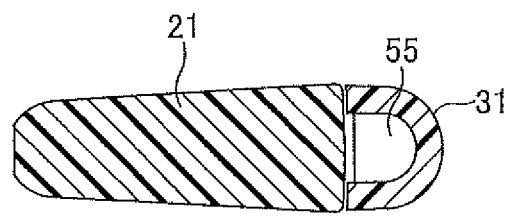
FIG. 14 is a sectional view illustrating a section taken along a line C-C of FIG. 6.

FIG. 14 is a sectional view illustrating a section taken along a line C-C of FIG. 6 and illustrates a section cut at a position of the reinforcement rib 55. As illustrated in FIG. 14, a rear end of the reinforcement rib 55 (end part on the upstream side) is disposed at a position shifted toward the front side from a position of a rear end of the curved part 51. The rear end of the reinforcement rib 55 and the fin body 21 are disposed with a fixed space in the longitudinal direction. The curved part 51 is prevented from falling down (bending) inward by forming the reinforcement ribs 55 inside the curved shape.

One of the four rib insertion parts 65 according to the present embodiment has a narrower groove width compared to the other rib insertion parts 65. More specifically, as illustrated in FIG. 6, a width W1 in the lateral direction of the second rib insertion part 65 from the right is narrower than a width W2 of the other rib insertion parts 65. The three rib insertion parts 65 other than the second rib insertion part 65 from the right are formed with the width W2. In other words, the width W1 of the second rib insertion part 65 from the right out of the four rib insertion parts 65 is narrower than the width W2 of the other rib insertion parts 65. The width W1 is the same as thickness of the reinforcement rib 55 or slightly larger than the thickness of the reinforcement rib 55. Accordingly, a space in the lateral direction between the second rib insertion part 65 from the right and the reinforcement rib 55 is narrower than between the other rib insertion parts 65 and the reinforcement rib 55. A size of the space between the second rib insertion part 65 from the right and the reinforcement rib 55 is 1/10 times as large as a size of the space between the other rib insertion parts 65 and the reinforcement rib 55. Accordingly, the reinforcement rib 55 inserted into the second rib insertion part 65 from the right is prevented from displacing the position in the lateral direction, and the position is almost fixed.

In terms of preventing the position displacement of the mounting member 31 to the fin body 21, it is preferable that all the widths of the four rib insertion parts 65 are set to the width W1, and the positions of the reinforcement rib 55 are fixed by all the four rib insertion parts 65. However, when all the four rib insertion parts 65 are formed with the width W1, extremely high positioning accuracy at the time of mounting the mounting member 31 to the fin body 21 is required, decreasing in the efficiency of mounting work. The mutual positions in the lateral direction of the rib insertion parts 65 and the reinforcement ribs 55 can be shifted due to thermal expansion and contraction of the fin body 21 and the mounting member 31. Accordingly, in the horizontal fin 11 according to the present embodiment, only one of the four rib insertion parts 65 is formed with the width W1 corresponding to the thickness of the reinforcement rib 55. Also, it is preferable that a reference position is closer to the center in the lateral direction so as to adjust the position of the mounting member 31 to the fin body 21. Therefore, the rib insertion part 65 with the width W1 is disposed inside in the lateral direction (second from the right).

Figure 4:
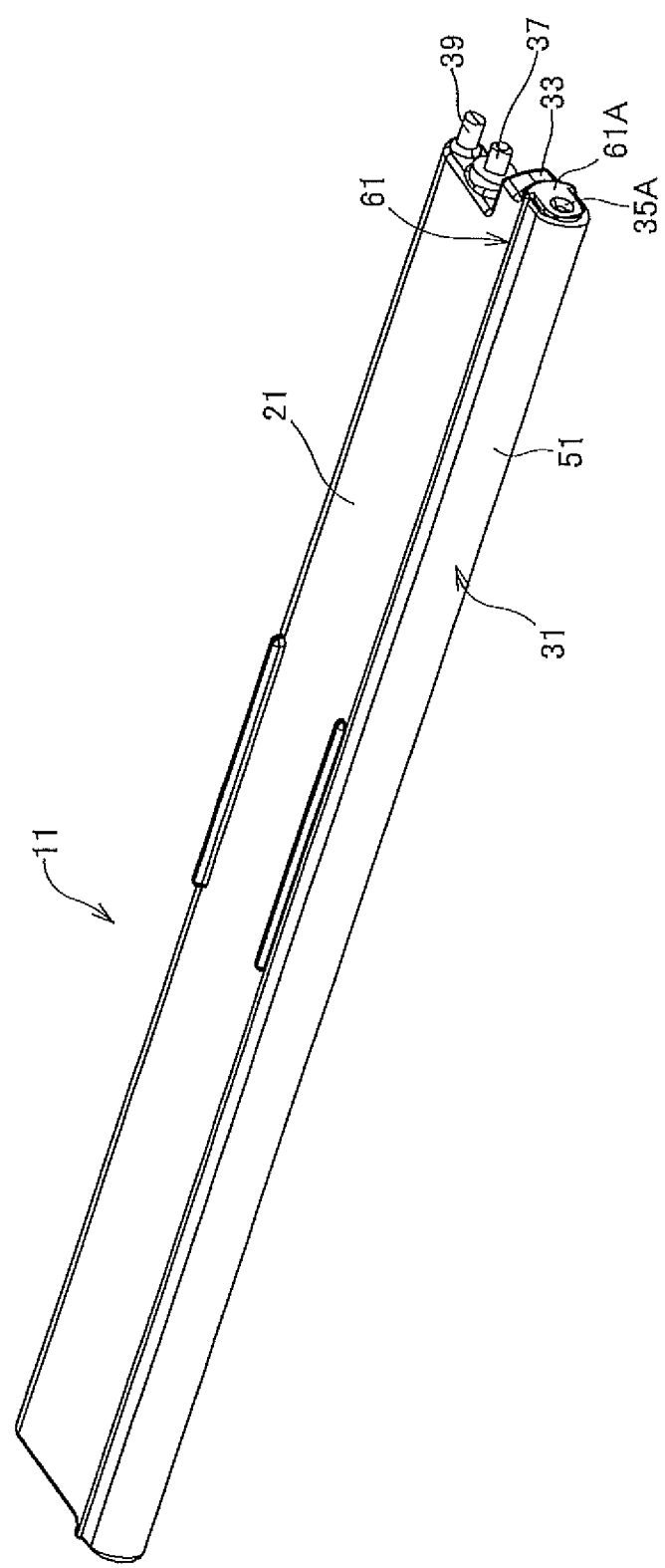
FIG. 4 is a perspective view of a horizontal fin seen from the front upper right.
Figure 5:
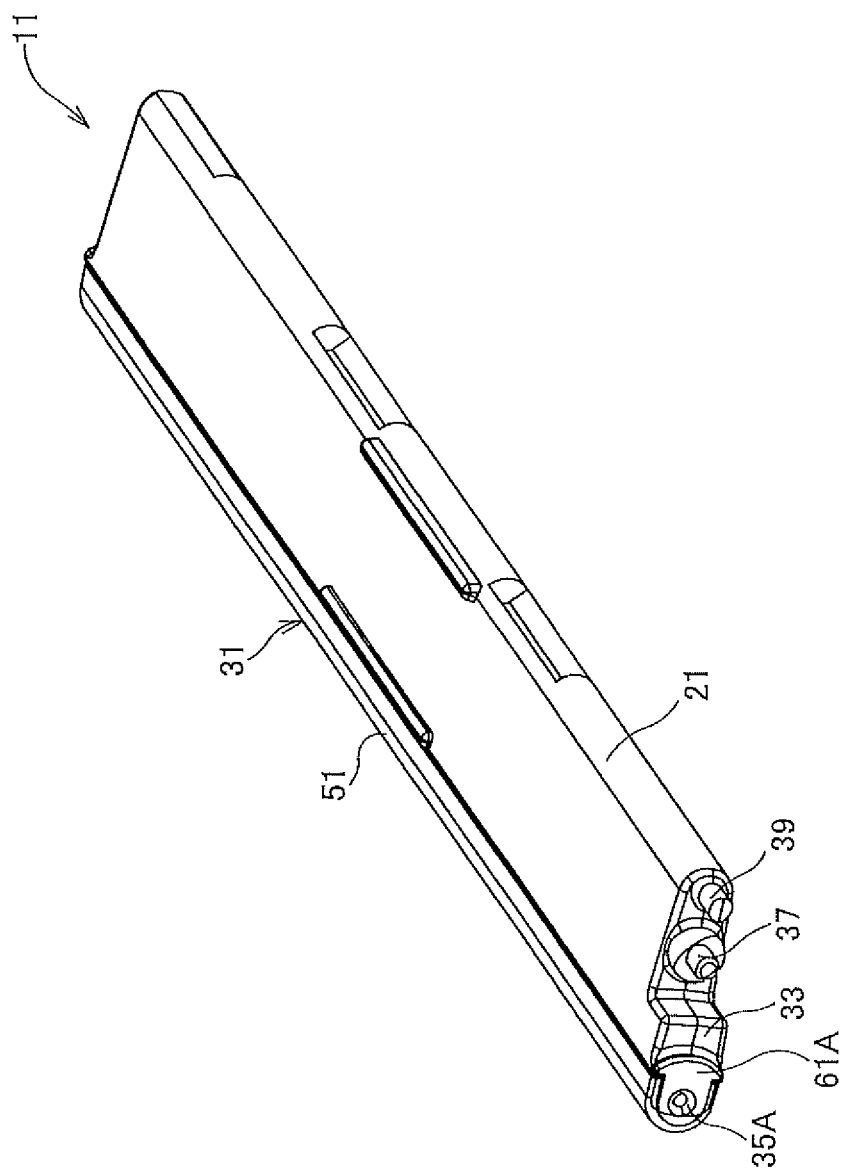
FIG. 5 is a perspective view of the horizontal fin seen from the rear upper right.

As illustrated in FIGS. 10 and 11, a pair of thin wall parts 57 is formed at each both end in the lateral direction of the curved part 51. Each of the pair of thin wall parts 57 is formed at a position corresponding to a position of the bearing part 61A of the downstream side edge part 61, i.e. the rotation shaft 35. As illustrated in FIGS. 4 and 5, the mounting member 31 is mounted so as to cover the bearing part 61A, i.e. a base end part of the rotation shaft 35 by the curved part 51. As illustrated in FIGS. 3, 6, and 9, the bearing part 61A is formed with a shaft diameter made larger at an outside part than inside in the lateral direction. The thin wall part 57 is formed thinly so as to correspond to a shape of the bearing part 61A becoming thicker. As illustrated in FIG. 10, the thin wall part 57 is gradually becoming thinner toward the outside from the inside in the lateral direction. The thin wall part 57 is formed with thin thickness over the semicircle of the curved part 51. The curved part 51 is formed with the thin wall part 57 by recessing the inner circumferential surface 51A. An outer circumferential surface of the curved part 51 at a part formed with the thin wall part 57 is formed at a constant curvature in the same way as the other parts. In other words, the curved part 51 is formed so as to be thin wall by recessing the inner circumferential surface 51A without changing the shape of the outer circumferential surface at a position of the thin wall part 57. Thus, since the shaft diameter of the bearing part 61A (base end part of the rotation shaft 35) can be ensured, the rigidity of the bearing part 61A is improved as well as the rotation shaft 35 can be stably held.

As illustrated in FIG. 12, the downstream side edge part 61 is formed with four first recessed parts 71. Each of the four first recessed parts 71 is formed at a tip part on a downstream side (front side) of the downstream side edge part 61. The four first recessed parts 71 according to the present embodiment have the same shape. The first recessed part 71 is formed by recessing a curved tip surface of the downstream side edge part 61. The first recessed part 71 is formed by recessing the downstream side edge part 61 from the front side toward the rear side. The first recessed part 71 is formed as a groove extended in the lateral direction. The first recessed part 71 is formed along the lateral direction with the same groove width.

Figure 15:
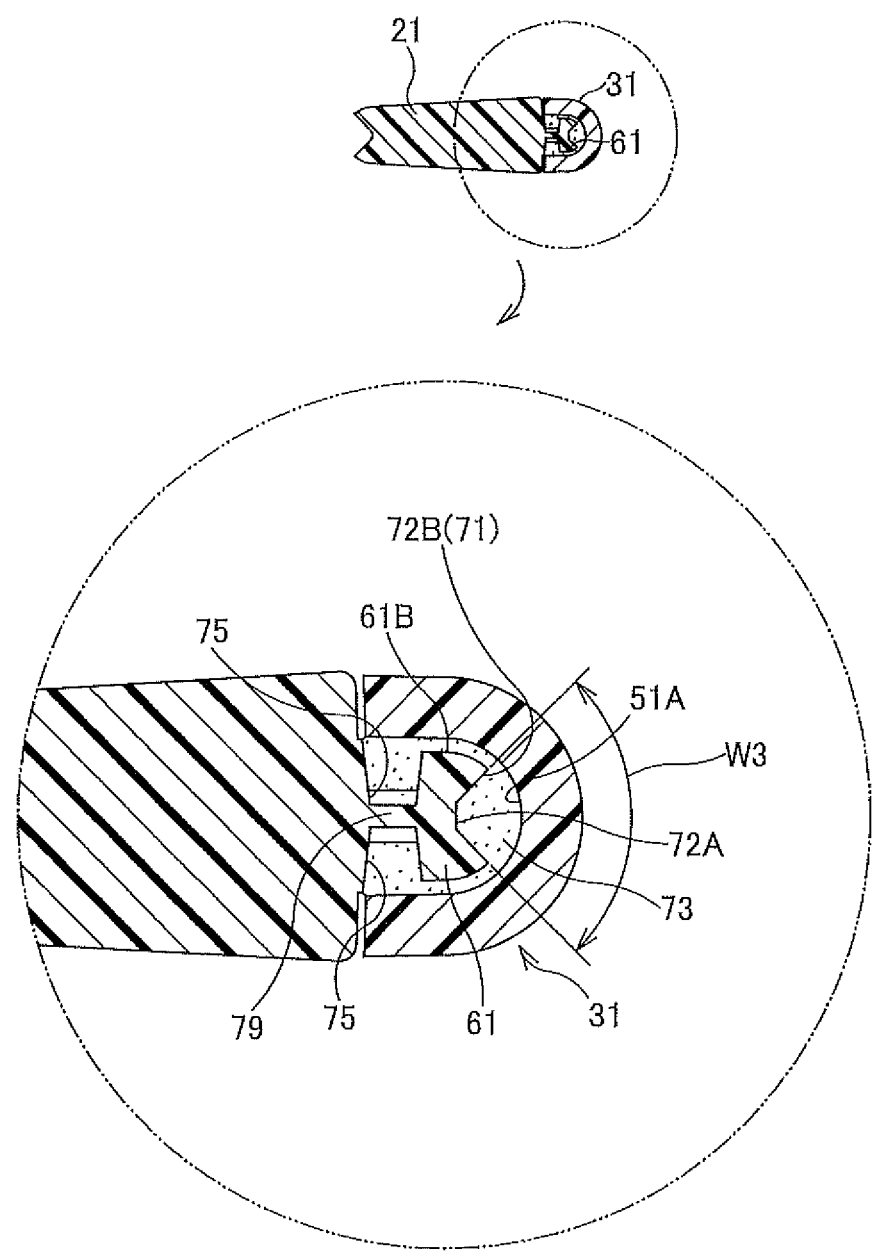
FIG. 15 is a sectional view illustrating a section taken along a line D-D of FIG. 6 and a partly enlarged view thereof.

FIG. 15 is a sectional view illustrating a section taken along a line D-D of FIG. 6, and illustrates a section cut at a position of the first recessed part 71. As illustrated in FIG. 15, a sectional shape of the first recessed part 71 cut in a plane along the vertical direction and the longitudinal direction is formed into a shape where a width W3 in the vertical direction is gradually expanded from a bottom part 72A (on the left side in the enlarged view of FIG. 15) toward an opening 72B (on the right side in an enlarged view of FIG. 15). The downstream side edge part 61 and the mounting member 31 are fixed to each other by an adhesive 73 filled in the first recessed part 71.

Figure 16:
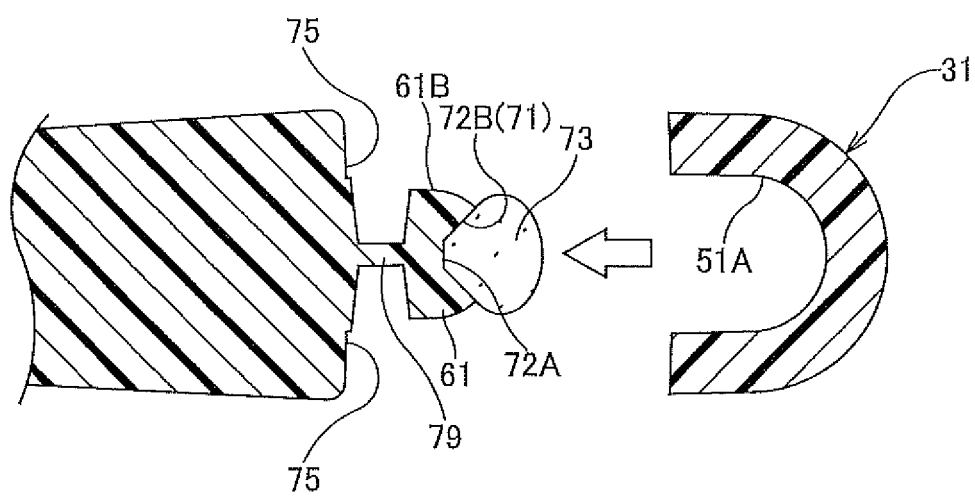
FIG. 16 is a diagram illustrating a state where is mounting the mounting member to a downstream side edge part.

FIG. 16 is a diagram illustrating a state where is mounting the mounting member 31 to the downstream side edge part 61. As illustrated in FIG. 16, firstly the adhesive 73 is filled inside the first recessed part 71. For example, the adhesive 73 is a thermosetting elastomer and a thermoplastic elastomer. The adhesive 73 is filled inside the first recessed part 71 by inserting a nozzle from the opening 72B of the first recessed part 71 and discharging the elastomer from the inserted nozzle. At this time, the nozzle can be easily inserted into the first recessed part 71 by widening the opening 72B of the first recessed part 71 more than the bottom part 72A. The adhesive 73 filled in the first recessed part 71 can be sufficiently filled to the bottom part 72A. For example, The adhesive 73 is filled until the first recessed part 71 is entirely filled with the adhesive 73. The mounting member 31 is mounted to the downstream side edge part 61 after the first recessed part 71 is filled with the adhesive 73. The claw parts 53 is engaged with each of the engaged parts 63 and the claw parts 54 is engaged with each of the engaged parts 64 to mount the mounting member 31 to the downstream side edge part 61. Thereby, the outer circumferential surface 61B of the downstream side edge part 61 and the inner circumferential surface 51A of the mounting member 31 are adhered to each other by the adhesive 73.

As illustrated in the enlarged view of FIG. 15, a pair of second recessed parts 75 is formed on the upstream side of each first recessed part 71. The pair of second recessed parts 75 is formed on a base end part (rear end part) of the downstream side edge part 61 by recessing the downstream side edge part 61 along the vertical direction. The pair of second recessed parts 75 has the same shape and a symmetrical shape in the vertical direction. As illustrated in FIG. 12, the second recessed part 75 has a rectangular shape along the lateral direction when seen from one side in the vertical direction. For example, the second recessed part 75 has a rectangular parallelepiped shape long in the lateral direction.

A connection part 77 where the downstream side edge part 61 is recessed more than the other parts is formed between the second recessed part 75 and the first recessed part 71. A width W4 in the lateral direction of the connection part 77 is the same as the width in the lateral direction of the first recessed part 71. A width in the lateral direction of the second recessed part 75 is longer than the width W4 of the connection part 77. A part of the adhesive 73 filled in the first recessed part 71 is overflown from the first recessed part 71 and spread out between the outer circumferential surface 61B and the inner circumferential surface 51A by mounting the mounting member 31 to the fin body 21. The adhesive 73 is flown into the second recessed part 75 through the connection part 77 (see FIG. 15). In other words, the adhesive 73 overflown after spreading out between the outer circumferential surface 61B and the inner circumferential surface 51A is flown into the second recessed part 75. Thereby, the adhesive 73 can be filled into the first recessed part 71 with the adhesive 73 remaining to some extent (with keeping room), and thus the adhesive 73 can be sufficiently spread out.

Also, as illustrated in the enlarged view of FIG. 15, the pair of second recessed parts 75 is formed with a connection part 79 interposed therebetween in the vertical direction. The thickness in the vertical direction of the connection part 79 is a minimum thickness in injection molding or the minimum thickness or less. Each of the pair of second recessed parts 75 is formed by pressing molds each other on the upper side and on the lower side in the vertical direction. A position of the connection part 79 is placed at a position of a parting line (PL) of the two molds. Collision of the molds in injection molding can be prevented by providing a small space between the pair of molds facing in the vertical direction. By providing a space between the pair of molds, the connection part 79 is formed, if resin is flown into a space provided between the pair of molds.

Figure 17:
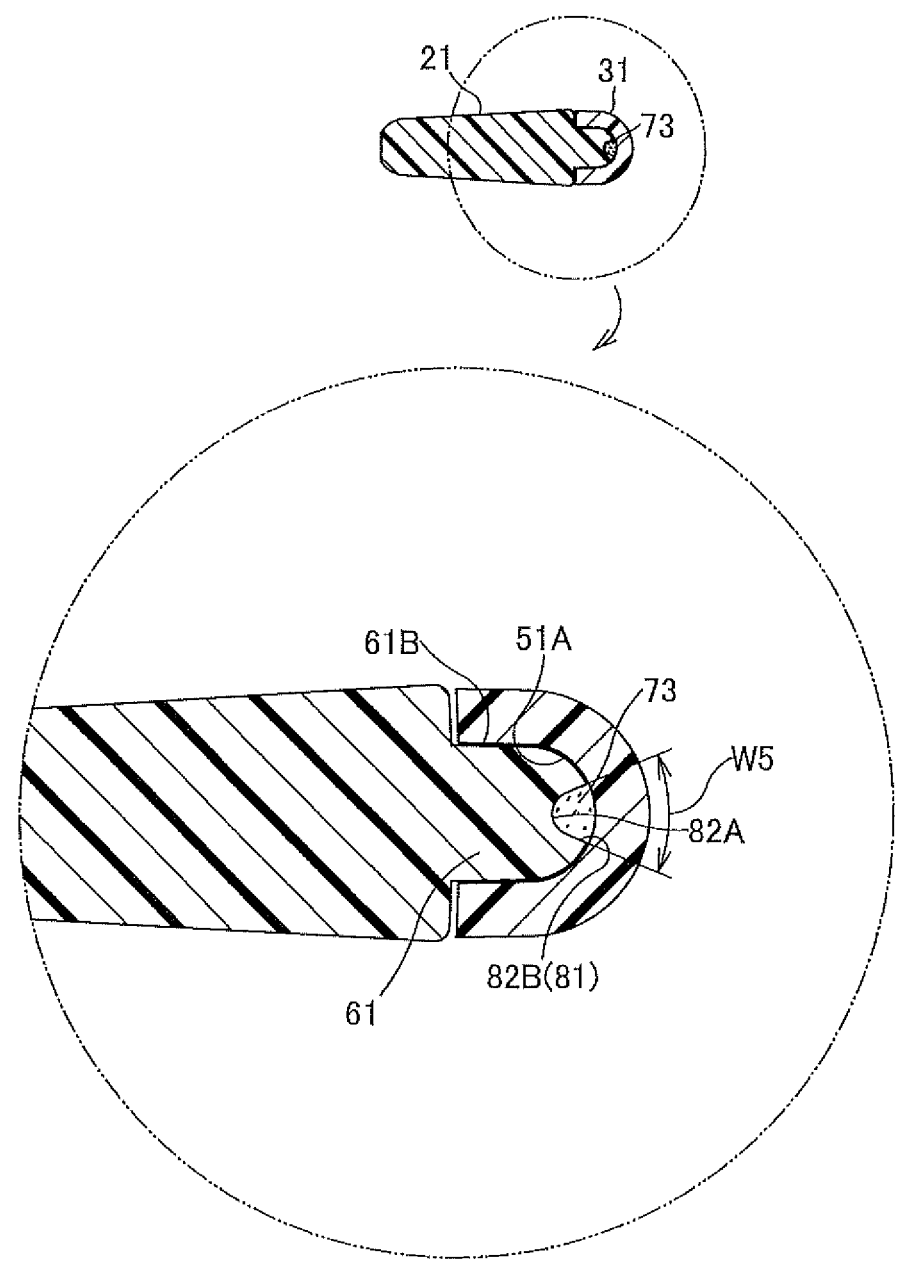
FIG. 17 is a sectional view illustrating a section taken along a line E-E of FIG. 6 and a partly enlarged view thereof.

As illustrated in FIG. 12, a pair of third recessed parts 81 is formed on the both sides of the first recessed part 71 in the lateral direction. The pair of third recessed parts 81 has the same shape and is communicated with the first recessed part 71. Each of the pair of third recessed parts 81 is formed by recessing the curved tip surface of the downstream side edge part 61. Each of the pair of third recessed parts 81 is formed by recessing the downstream side edge part 61 from the front side toward the rear side. The third recessed part 81 is a groove formed along the lateral direction. FIG. 17 is a sectional view illustrating a section taken along a line E-E of FIG. 6 and illustrates a section cut at a position of the third recessed part 81. As illustrated in FIG. 17, a sectional shape of the third recessed part 81 cut at a plane along the vertical direction and the longitudinal direction is a shape where a width W5 in the vertical direction is gradually expanded from a bottom part 82A (on the left side in an enlarged view of FIG. 17) toward an opening 82B (on the right side in the enlarged view of FIG. 17). The width W5 of the third recessed part 81 is shorter than the width W3 of the first recessed part 71. Accordingly, although the third recessed part 81 is a shape where the opening 82B side is expanded as in the case with the first recessed part 71, the groove of the third recessed part 81 is narrower than that of the first recessed part 71.

A part of the adhesive 73 filled in the first recessed part 71 is overflown from the first recessed part 71 and flown into the third recessed part 81 from the both sides of the first recessed part 71 by mounting the mounting member 31 to the fin body 21. In other words, the adhesive 73 can be filled into the first recessed part 71 with the adhesive 73 remaining to some extent (with keeping room). The adhesive 73 flown to the outside in the lateral direction from the first recessed part 71 can be prevented from flowing into the rib insertion part 65. That is, the adhesive 73 can be prevented from applying to unintended places. As described above, in the horizontal fin 11 according to the present embodiment, the fin body 21 and the mounting member 31 can be firmly fixed to each other by the adhesive 73 filled in the first recessed part 71.

The horizontal fin 11 is one example of a fin for register. The reinforcement rib 55 is one example of a rib.

According to the above embodiment, the following technical effects are brought out.

(1) The horizontal fin 11 according to the present embodiment includes the fin body 21 formed into a plate shape and the mounting member 31 mounted to the downstream side edge part 61 of the fin body 21 in a longitudinal direction as a wind flowing direction (one example of an air blowing direction). The mounting member 31 is formed into a curved shape so as to cover the downstream side edge part 61 of the fin body 21. The downstream side edge part 61 includes the first recessed part 71 at a tip part on the front side (the downstream side) in the longitudinal direction. The first recessed part 71 is formed by recessing the tip part of the downstream side edge part 61. The downstream side edge part 61 and the mounting part 31 are fixed to each other by the adhesive 73 filled in the first recessed part 71.

According to the above, the first recessed part 71 to be filled with the adhesive 73 is provided at the downstream side edge part 61 of the fin body 21. The mounting member 31 is fixed to the fin body 21 by the adhesive 73 filled into the first recessed part 71. The adhesive 73 filled into the first recessed part 71 is applied to the inner circumferential surface 51A of the mounting member 31. The adhesive 73 overflown from the first recessed part 71 spreads out between the outer circumferential surface 61B of the downstream side edge part 61 and the inner circumferential surface 51A of the mounting member 31 by mounting the mounting member 31 to the fin body 21. Thus, the mounting member 31 can be firmly fixed to the fin body 21.

(2) The downstream side edge part 61 includes the second recessed part 75 provided on the upstream side of the first recessed part 71. The second recessed part 75 is formed by recessing the downstream side edge part 61 in the thickness direction (vertical direction) of the fin body 21. According to the above, the second recessed part 75 is provided on the upstream side of the first recessed part 71 (see the enlarged view of FIG. 15). The adhesive 73 overflown from the first recessed part 71 flows between the outer circumferential surface 61B of the downstream side edge part 61 and the inner circumferential surface 51A of the mounting part 31, and then flows into the second recessed part 75. Accordingly, the adhesive 73 overflown from a space between the downstream side edge part 61 and the mounting member 31 can be poured into the second recessed part 75. In other words, the adhesive 73 can be sufficiently spread out between the downstream side edge part 61 and the mounting member 31, and further the excess adhesive 73 can be poured into the second recessed part 75, improving the adhesion effect.

(3) The fin body 21 is formed into a plate shape long in the lateral direction (one example of one direction). The downstream side edge part 61 includes the pair of third recessed parts 81 on the both sides of the first recessed part 71 in the longitudinal direction of the fin body 21. Each of the pair of third recessed part 81 is formed by recessing the downstream side edge part 61 and has the groove with the width W5 narrower than the first recessed part 71. According to the above, the pair of third recessed parts 81 is provided on the both sides of the first recessed part 71. The adhesive 73 overflown from the first recessed part 71 is flown into the pair of third recessed parts 81. Accordingly, the adhesive 73 overflown from the first recessed part 71 is poured into the pair of third recessed parts 81 and can be prevented from flowing out to the outside of the third recessed part 81 (the outside in the lateral direction etc.) by mounting the mounting member 31 to the downstream side edge part 61. Thus, the overflown adhesive 73 can be prevented from applying to the unintended places by sneaking to the outside of the first recessed part 71 in the longitudinal direction (inside the rib insertion part 65 etc.)

(4) The first recessed part 71 is formed by gradually expanding the width W3 in the thickness direction of the fin body 21 from the bottom part 72A toward the opening 72B (see the enlarged view of FIG. 15). If the width of the opening 72B of the first recessed part 71 is narrow, the adhesive 73 may not be sufficiently flown to the bottom part 72A even if the adhesive 73 is filled from the opening 72B of the first recessed part 71. Thus, the adhesive 73 can be easily flown to the bottom part 72A by forming the first recessed part 71 into a shape of gradually expanding from the bottom part 72A toward the opening 72B, i.e. by largely expanding the opening 72B. Thereby, the adhesion effect can be improved.

(5) The mounting member 31 includes the plurality of reinforcement ribs 55. The plurality of reinforcement ribs 55 are formed into a semicircle shape to connect the curved inner circumferential surface 51A of the mounting member 31. The downstream side edge part 61 includes the plurality of rib insertion parts 65 to be inserted by each of the plurality of reinforcement ribs 55. The plurality of rib insertion parts 65 include a first rib insertion part (the second rib insertion part 65 from the right in the present embodiment). The space between the second rib insertion part 65 from the right and the reinforcement rib 55 is narrower than the spaces between the other rib insertion parts 65 and the reinforcement ribs 55.

According to the above, the space between the second rib insertion part 65 from the right and the reinforcement rib 55 is narrower than the spaces between the other rib insertion parts 65 and the reinforcement ribs 55. Accordingly, movement range of the reinforcement rib 55 inserted into the second rib insertion part 65 from the right is restricted compared to the other reinforcement ribs 55. Thereby, the position displacement of the mounting member 31 to the fin body 21 can be suppressed. On the other hand, if all the spaces between the rib insertion parts 65 and the reinforcement ribs 55 become narrower, positioning of the rib insertion parts 65 and the reinforcement ribs 55 in the mounting work becomes difficult, and thus the work efficiency may be decreased. Therefore, the position displacement of the mounting member 31 to the fin body 21 after mounted can be suppressed while suppressing the decrease in the efficiency of mounting work by making only one of the plurality of rib insertion parts 65 narrower.

(6) The fin body 21 is formed into a plate shape long in the lateral direction (one example of one direction) and includes the pair of rotation shafts 35 provided on the each both end surface in the longitudinal direction. Each of the pair of rotation shafts 35 protrudes toward the outside in the longitudinal direction from each of the end surfaces 33 on both sides and is supported by the retainer 13. The mounting member 31 is extended along the longitudinal direction of the fin body 21 and includes the pair of thin wall parts 57 formed on the each both side in the longitudinal direction. The pair of thin wall parts 57 is formed at positions corresponding to each of the pair of rotation shafts 35 and is thinner than the other parts of the mounting member 31.

According to the above, the mounting member 31 is formed with the thin wall part 57 so as to be thinner corresponding to the position of the rotation shaft 35. Accordingly, the shaft diameter of the pair of rotation shafts 35 can become larger only by a portion of thinning the mounting member 31 at parts covered with the mounting member 31. As a result, thickness of the rotation shaft 35 can be ensured, improving the rigidity of the rotation shaft 35.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of this application have been described in detail, it should be understood that the various changes, substitutions, and alterations could be made hereto without departing from the spirit and scope of the invention.

For example, the shape, the forming position, and the forming number of the members in the register 10 described above are one example. For example, the first recessed part 71 may not be four but one, two, three, or more than five. The four first recessed parts 71 may not be the same shape. The rib insertion part 65 may not be four but one, two, three, or more than five.

A position of forming the first recessed part 71 may not be on the tip part (front surface) of the downstream side edge part 61. For example, the first recessed part 71 may be formed at the upper part and the lower part of the tip part in the downstream side edge part 61.

The register 10 may not include the second recessed part 75.

The register 10 may not include the third recessed part 81.

Although the first recessed part 71 is a shape where the width W3 gradually expands from the bottom part 72A toward the opening 72B, the shape of the first recessed part 71 is not limited to this shape. For example, the first recessed part 71 may be a groove formed into a rectangular parallelepiped shape with the width W3 from the bottom part 72A to the opening 72B fixed and a groove formed into a shape with the width W3 narrowed from the bottom part 72A toward the opening 72B.

Although the width W1 of the second rib insertion part 65 from the right out of the four rib insertion parts 65 is made narrower than the width W2 of the other rib insertion parts 65 in the above embodiment, the widths are not limited to the above. For example, the four rib insertion parts 65 may have the same width. The widths of the two rib insertion parts 65 out of the four rib insertion parts 65 may be the width W1. All the rib insertion parts 65 may have the same shape, and the thickness in the lateral direction of the one reinforcement rib 55 out of the four reinforcement ribs 55 may be thicker than that of the other reinforcement ribs 55. That is, the rib insertion part 65 may have the same shape, and the shape of the reinforcement rib 55 may be changed so that the space between the rib insertion part 65 and the reinforcement rib 55 is adjusted.

The mounting member 31 may not include the thin wall part 57.

What is claimed is:

1. A fin for register pivotable between a pair of side walls facing with each other in a retainer of the register and changing a direction of air blown out from the register comprising: a fin body formed into a plate shape; and a mounting member mounted to a downstream side edge part that is on a downstream side of the fin body in an air blowing direction, wherein the mounting member has a curved shape so as to cover the downstream side edge part of the fin body, the downstream side edge part includes a first recessed part at a tip part on the downstream side in the air blowing direction, the first recessed part is formed by recessing the tip part of the downstream side edge part, the downstream side edge part and the mounting member are fixed to each other by an adhesive filled in the first recessed part, the downstream side edge part includes a second recessed part on an upstream side of the first recessed part in the air blowing direction, the second recessed part is formed by recessing the downstream side edge part in a thickness direction of the fin body, and a portion of the adhesive overflowed from the first recessed part is in the second recessed part, wherein the second recessed part directly abuts and is encompassed by the mounting member, and wherein all the adhesive is contained between the connection of the mounting member and the second recessed part of the fin body.

2. The fin for register according to claim 1, wherein the fin body is formed into a plate shape long in one direction,
wherein the downstream side edge part includes a pair of third recessed parts on both sides of the first recessed part in a longitudinal direction of the fin body,
wherein each of the pair of third recessed parts is formed by recessing the downstream side edge part and has a groove with a width in the longitudinal direction narrower than the first recessed part.

3. The fin for register according to claim 1, wherein
the first recessed part is formed by gradually expanding a width in a thickness direction of the fin body from a bottom part toward an opening.

4. The fin for register according to claim 1, wherein
the fin body includes a pair of rotation shafts with each one of the pair of rotation shafts being on opposite end surfaces in a longitudinal direction of the fin body,
the plate shape of the fin body is longest in the longitudinal direction,
each of the pair of rotation shafts protrudes toward an outside in the longitudinal direction from the opposite end surfaces and is supported by the retainer,
the mounting member extends along the longitudinal direction of the fin body and includes a pair of thin wall parts, one of each formed on opposite ends of the fin body in the longitudinal direction, and
each of the pair of thin wall parts is formed at a position corresponding to respective ones of the pair of rotation shafts and is thinner than any single part or combination of parts of the mounting member.

5. A fin for register pivotably provided between a pair of side walls facing with each other in a retainer of the register and changing a direction of a wind blown out from the register comprising: a fin body formed into a plate shape; and a mounting member mounted to a downstream side edge part of the fin body in an air blowing direction as a wind flowing direction, wherein the mounting member is formed into a curved shape so as to cover the downstream side edge part of the fin body, the downstream side edge part includes a first recessed part at a tip part on the downstream side in the air blowing direction, the first recessed part is formed by recessing the tip part of the downstream side edge part, the downstream side edge part and the mounting member are fixed to each other by an adhesive filled in the first recessed part, the mounting member includes a plurality of ribs, the plurality of ribs has a semicircular shape to connect a curved inner circumferential surface of the mounting member, the downstream side edge part includes a plurality of rib insertion parts to be inserted by each of the plurality of ribs, and the plurality of rib insertion parts includes a first rib insertion part, and a space between the first rib insertion part and the rib is narrower than spaces between the rib insertion parts other than the first rib insertion part and the ribs.

* * * * *